United States Patent [19]

Peddinghaus

[11] 4,362,460

[45] Dec. 7, 1982

[54] DEVICE FOR DISENTANGLING BARS

[76] Inventor: Rolf Peddinghaus, Deterberger Str. 25, Ennepetal, Fed. Rep. of Germany

[21] Appl. No.: 141,181

[22] Filed: Apr. 17, 1980

[30] Foreign Application Priority Data

Apr. 21, 1979 [DE] Fed. Rep. of Germany ....... 2916228

[51] Int. Cl.³ ............................................. B65G 47/12
[52] U.S. Cl. .................................. 414/745; 198/443; 198/445
[58] Field of Search ................ 414/745, 748; 198/396, 198/443, 445, 782; 221/187, 190, 254; 193/35 SS

[56] References Cited

U.S. PATENT DOCUMENTS

| | | | |
|---|---|---|---|
| 2,407,638 | 9/1946 | Gettig et al. | 221/254 |
| 2,995,235 | 8/1961 | Maier | 198/443 X |
| 3,195,737 | 7/1965 | Melrose | 414/745 X |
| 3,232,449 | 2/1966 | Shen | 414/748 |
| 3,265,186 | 8/1966 | Burton | 193/35 SS X |
| 3,394,822 | 7/1968 | Bethke | 198/782 X |

FOREIGN PATENT DOCUMENTS

| 1247950 | 8/1967 | Fed. Rep. of Germany | 414/745 |
|---|---|---|---|
| 522942 | 7/1976 | U.S.S.R. | 221/254 |

Primary Examiner—Leslie J. Paperner
Attorney, Agent, or Firm—Holman & Stern

[57] ABSTRACT

A device for disentangling bundles of concrete-reinforcing steel bars comprises a storage bed composed of a number of frame units each of which defines a respective upwardly opening V-shaped recess, the bars being received in the recesses and the frame units being spaced apart longitudinally of the bars with the recesses mutually aligned. A plurality of lifters intermesh with the frame units, each lifter being vertically movable in a space defined between a respective adjacent pair of the frame units and including a middle part having a flat upper surface whose width perpendicular to the bars is intermediate the width of an upper end of each recess and the width of a lower end of each recess. Means is also provided for raising and lowering the lifters.

8 Claims, 3 Drawing Figures

DEVICE FOR DISENTANGLING BARS

BRIEF SUMMARY OF THE INVENTION

This invention relates to a device for disentangling bars, particularly concrete reinforcing steel bars which are bundled together and which are to be conveyed from a storage bed.

Normally concrete-reinforcing steel bars are gathered and tied in bundles after they have been made and in this form supplied to the consumer. On site the bundles are deposited on special storage beds and opened so that the bars roll apart and spread out within the lateral confines of said storage bed. Then the bars are taken, either singly or several at a time, from the storage bed and conveyed to a place of further treatment, notably to cutting shears followed by a bending machine. Concrete-reinforcing bars have a considerable length, viz. approximately 16 meters, and, especially if, on the one hand they are rather thin, and, on the other hand, provided with fins, as is typical for concrete reinforcing applications, they have a tendency to catch and tangle with one another so that most of the bars tend to lie at an angle relative to the ideal longitudinal bar direction. Still more serious is the occasional slight deformation resulting from such tangling of the bars, very often caused by attempted efforts to disentangle and single them out, which can cause considerable difficulties in respect of the subsequent conveying of the bars in the said ideal longitudinal bar direction in as much as adjacent bars are liable to be dragged along and either suffer or cause further deformations.

The present invention has for its aim to enable disentanglement and singling out of the steel bars after the bundles have been deposited on the storage bed and their tie-wires cut, so that the bars may be conveyed further without major difficulties. Normally they would then be conveyed in the direction of their length, but conveying in the transverse direction is also possible.

According to the present invention there is provided a device for disentangling bars, comprising a storage bed composed of a number of frame units each of which defines a respective upwardly opening V-shaped recess, said bars being received in the recesses and said frame units being spaced apart longitudinally of said bars with the recesses mutually aligned, a plurality of lifters which intermesh with said frame units, each said lifter being vertically movable in a space defined between a respective adjacent pair of said frame units and including a middle part having a flat upper surface whose width perpendicular to said bars is intermediate the width of an upper end of each recess and the width of a lower end of each recess, and means for raising and lowering said lifters.

In this way, due to the raising of the lifters which intermesh with the frame units of the storage bed, the entire content of a storage bed, which is initially closely bunched up, is divided up into three distinct piles, one of which stays resting on the horizontal middle parts of the lifters whilst the other two piles of steel bars slide off on either side when the lifters are raised up. By choosing a suitable width for the lifters, which will depend, on the one hand, on the number of bars to be conveyed further, and, on the other hand, on the sizes of the steel bars, it is possible to achieve the result that only a comparatively small number of steel bars remain resting on the horizontal middle parts of the raised lifters. This means that these bars are far less likely to continue in their previous tangled state and it will often be found that the bars which remain resting on the middle parts of the lifters are already adequately disentangled. However, if they should not yet be sufficiently disentangled and singled out, this can be quite easily improved to any desired degree by further lifter movement, e.g. shaking or briefly dropping and re-raising the lifters, which can be very easily done. Moreover, since the number of reinforcing bars which is to be conveyed further at any given time is always only a very small fraction of the total number of bars contained in the storage bed, the weight of the load which has to be lifted is also comparatively small.

The above described effect is still further improved by the provision of downwardly diverging lateral leg portions next to the middle parts of the lifters. The outwardly directed downward slope of these leg portions not only enables the lifters to be inserted like a wedge, as it were, between the tangled mass of bars resting on a storage bed, but also makes for a gentle descent of the supernumerary bars picked up by the raised middle parts but not fully supported thereon so that they slip gently back to the bottom of the storage bed. This also makes the subsequent lowering of the lifters much easier. Incidentally, the lifters may be provided with additional means, known per se, for relieving their own weight so that the work output can be confined substantially to a surmounting of friction forces and lifting the bar load.

The described operation is further improved by the inclusion of a relative movement between the lifters and upwardly pointed, raisable pusher elements. With the aid of such pusher elements the remaining bars on the middle parts of the lifters may be once more subdivided into two distinct batches, as may be required, to achieve even better disentanglement and singling out of the bars, especially where the middle parts of the lifters are comparatively wide. Such pusher elements also permit an optimal selection to be made in respect of the effective width of the middle parts for a given type of reinforcing bars to be disentangled in this fashion in as much as the width of the middle parts of the lifters can be reduced from its full value to practically zero by fully raising and pushing the pusher elements up in the lifters. Obviously, such upward extension of the pusher elements takes place only after the lifting movement of the lifters has started.

The middle portions of the lifters may further be provided with rollers of the proposed kind which, on the one hand, make a valuable contribution in the singling out of the tangled bars and, on the other hand, facilitate their conveying and, if positively driven, may even take over the conveying function altogether. Accordingly rollers, particularly when provided with double-V-profiles also known as 'diabolo' profile rollers, may assume the functional role of the earlier described pusher elements.

Lastly, a common supporting frame travelling on rails, may be provided to cope with conditions and requirements on sites comprising a greater number of storage beds. In that case the lifters may then be readily driven beneath the particular storage bed from which bars are to be taken for further treatment. Such an arrangement can achieve significant economies in plant and equipment costs.

BRIEF DESCRIPTION OF THE SEVERAL VIEWS OF THE DRAWINGS

The invention is further explained with reference to an embodiment thereof illustrated by way of example in the accompanying schematic drawings wherein.

DETAILED DESCRIPTION

Figure 1:
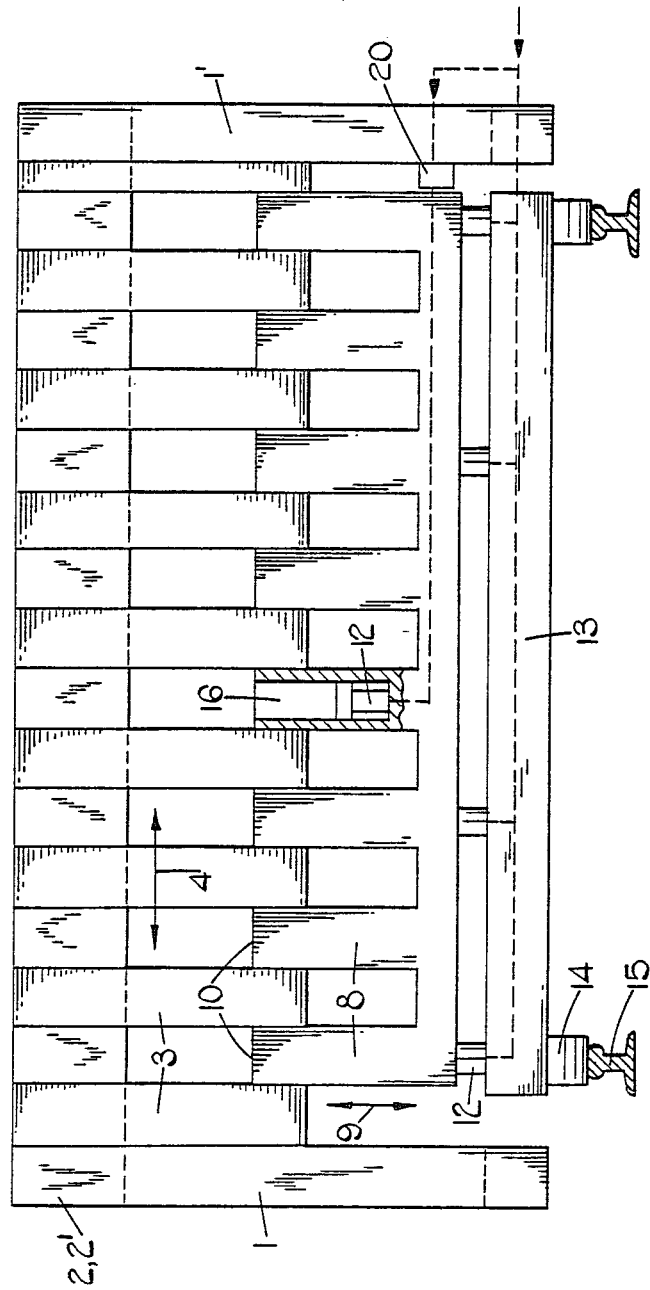
FIG. 1 is a lateral elevation view partly in cross-section of an embodiment of the invention.
Figure 2:
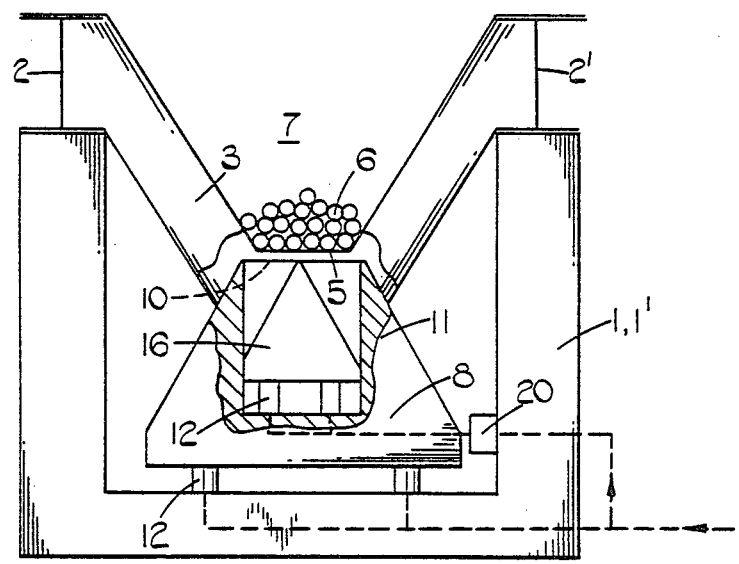
FIG. 2 is an end view partly in cross-section of the embodiment of FIG. 1.

As shown in FIGS. 1 and 2, the device according to this invention comprises U-shaped frame units 1,1', e.g. made of reinforced concrete, at both ends or narrow sides of the storage bed. The upper edges of these frame units support girders 2,2' extending in the direction of the length of the storage bed and from which issue at predetermined, spaced intervals, further, inner frame units 3 of generally V-form extending vertically relative to the ideal longitudinal bar direction 4 with a horizontal portion 5 at the bottom side thereof. Thus the concrete-reinforcing steel bars 6 are confined in the V-cut 7, as clearly shown in FIG. 2.

The lifters 8 are arranged in such a way as to intermesh with the frame units 3. They are movable in the above described manner in the direction of the double-headed arrow 9. The drawing shows the horizontal middle parts 10 on which, when these are in the raised position—not shown in the drawing—some of the steel bars 6 remain supported. The leg parts 11 diverge obliquely downwards from the middle parts 10 so that the lifters as a whole can be pushed up wedge-fashion-wise into the V-cuts 7. Hydraulic rams 12 are provided for the purpose of lifting the lifters and permit also a vertical adjustment of the lifters relative to a common supporting frame 13 provided with wheels 14 for travel on rails 15 so that it can be driven below any required storage bed.

FIG. 2 also shows the provision of tapered or wedge shaped pusher elements 16 in the lifters 8, which are also adapted to be vertically raised or lowered relative to the latter by hydraulic rams 21 thereby applying the earlier described action to the steel bars 6. As aforesaid, provision is made, for example by means of a valve 20 in the hydraulic fluid line connected to the hydraulic means 12 and 21 (shown schematically in FIG. 2) responsive to the positions of the lifters 8, to ensure that upward movement of the pusher elements 16 does not take place before the start of upward movement of the lifters 8. Valve 20 can be actuated by a conventional means such as a limit switch or proximity switch, for example (not shown).

Figure 3:
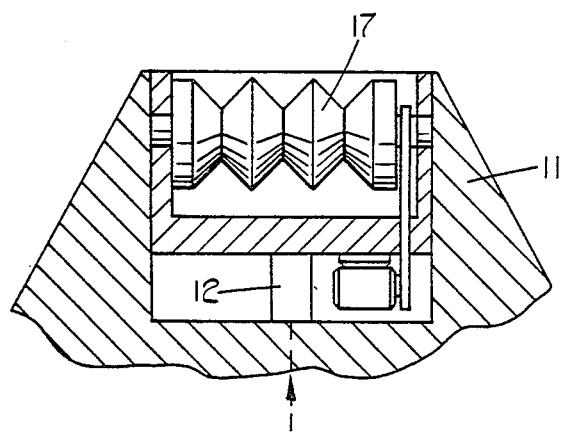
FIG. 3 is a cross-sectional view showing a roller profile.
Figure 2:
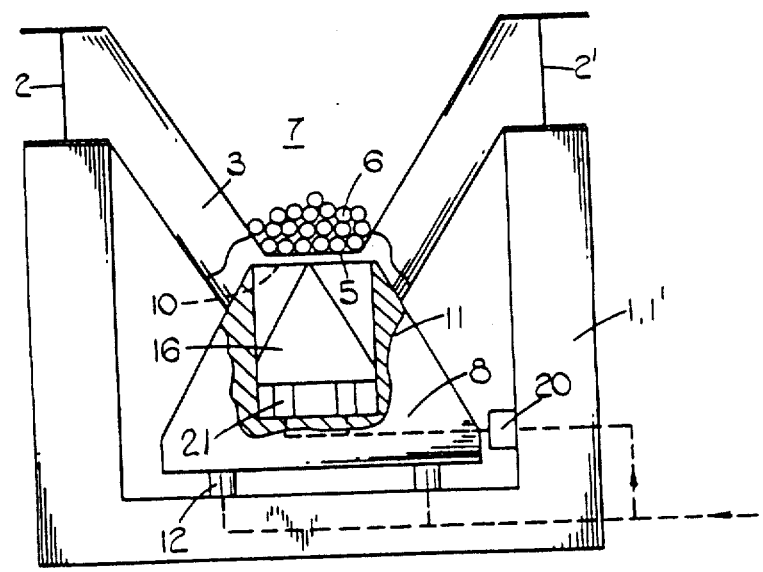
Figure 3:
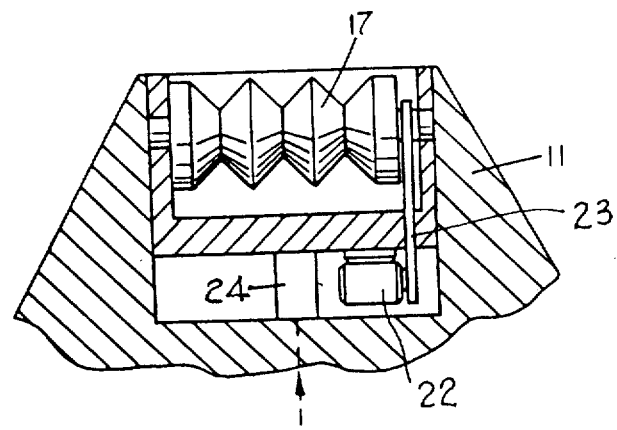

FIG. 3, finally, shows a roller 17 of multiple adjoining V-—or diabolo-profile form. This type of roller may be arranged in the region of the middle part 10 of each lifter and may also be mounted for vertical up and down movement in this region to facilitate the desired singling out and subsequent conveying of the steel bars 6.

The rollers 17 are adapted to be driven by a suitable means, such as electric motor 22 and belt 23, for example, and are vertically movable by hydraulic rams 24 in the same manner as described above for the pusher elements 16.

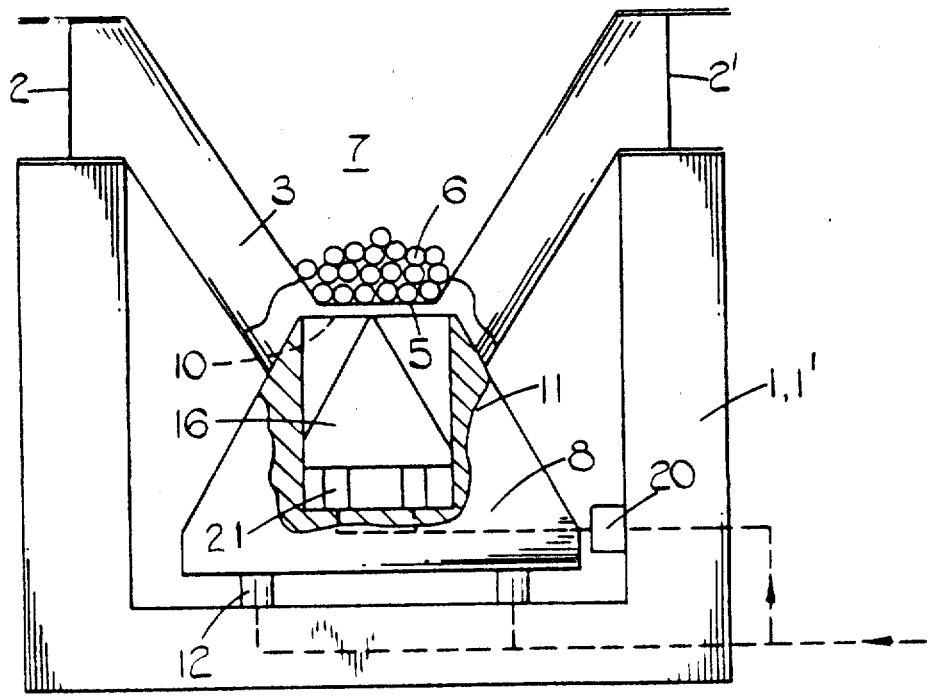

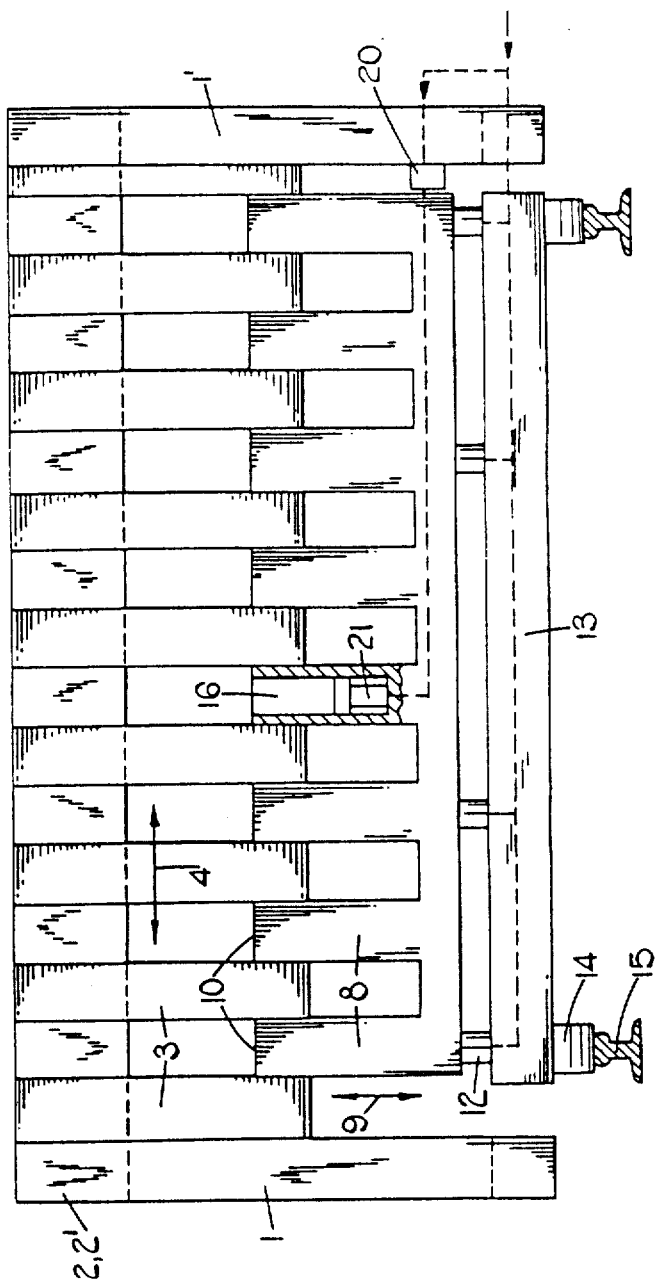

I claim:

1. A device for disentangling bars, comprising a storage bed composed of a number of frame units each of which defines a respective upwardly opening V-shaped recess, said bars being received in the recesses and said frame units being spaced apart longitudinally of said bars with the recesses mutually aligned, a plurality of lifters which intermesh with said frame units, each said lifter being vertically movable in a space defined between a respective adjacent pair of said frame units and including a middle part having a substantially horizontal flat upper surface for supporting at least a portion of the disentangled bars whose width perpendicular to the longitudinal axis of said storage bed is intermediate the width of an upper end of each recess and the width of a lower end of each recess, and means for raising and lowering said lifters.

2. The device according to claim 1, wherein each said lifter includes downwardly divergent leg portions at opposite ends of said middle part having said flat upper surface.

3. The device according to claim 1, wherein a common supporting frame is provided for said lifters and said means for raising and lowering operates so that said lifters are raised and lowered in unison, and a plurality of storage beds are provided, said common supporting frame being movable relative to said storage beds along rails extending perpendicularly to the longitudinal axis of each storage bed, when in position for said raising and lowering, to enable said common supporting frame and said lifters to be moved selectively beneath any one of said plurality of storage beds.

4. A device for disentangling bars, comprising a storage bed composed of a number of frame units each of which defines a respective upwardly divergent recess, said bars being received in said recesses and said frame units being spaced apart longitudinally of said bars with said recesses mutually aligned, a plurality of lifters which intermesh with said frame units, each said lifter being vertically movable in a space defined between a respective adjacent pair of said frame units and including a middle part having a flat upper surface whose width perpendicular to the longitudinal axis of said storage bed is intermediate the width of an upper end of each recess and the width of a lower end of each recess, means for raising and lowering said lifters, a plurality of wedge-shaped pusher members each of which is upwardly pointed to form an upper apex, each said pusher members being disposed in a respective one of said lifters and being vertically movable relative thereto into and out of a position in which said apex of said pusher member is below said flat upper surface of said respective one of said lifters, and means for preventing movement of each said pusher member out of said position prior to commencement of upward movement of said respective ones of said lifters.

5. A device for disentangling bars, comprising a storage bed composed of a number of frame units each of which defines a respective upwardly divergent recess, said bars being received in said recesses and said frame units being spaced apart longitudinally of said bars with said recesses mutually aligned, a plurality of lifters which intermesh with said frame units, each said lifter being vertically movable in a space defined between a respective adjacent pair of said frame units and including a middle part having a substantially flat upper surface whose width perpendicular to the longitudinal axis of said storage bed is intermediate the width of an upper end of each recess and the width of a lower end of each recess, and means for raising and lowering said lifters, the middle part of each said lifter being provided with a roller which is rotatable about an axis perpendicular to the longitudinal axis of said storage bed and which has raised lateral faces, and means is provided for driving said roller in a bar conveying direction parallel to the longitudinal axis of said storage bed.

6. The device according to claim 5, wherein each said roller has a double-V or 'diabolo' profile.

7. The device according to claim 6, wherein each said roller presents a multiple double-V profile configuration.

8. The device according to claim 5, wherein each said roller is mounted on the respective lifter for upward and downward movement relative thereto.

* * * * *

UNITED STATES PATENT AND TRADEMARK OFFICE
CERTIFICATE OF CORRECTION

PATENT NO. : 4,362,460                                Page 1 of 4

DATED      : December 7, 1982

INVENTOR(S) : Rolf Peddinghaus

It is certified that error appears in the above-identified patent and that said Letters Patent is hereby corrected as shown below:

The title page showing the illustrative figure and Figs. 1, 2 and 3 should be deleted to appear as per attached pages.

Signed and Sealed this

Sixth Day of September 1983

[SEAL]

Attest:

GERALD J. MOSSINGHOFF

Attesting Officer          Commissioner of Patents and Trademarks

United States Patent
Peddinghaus

[11] 4,362,460
[45] Dec. 7, 1982

[54] DEVICE FOR DISENTANGLING BARS

[76] Inventor: Rolf Peddinghaus, Deterberger Str. 25, Ennepetal, Fed. Rep. of Germany

[21] Appl. No.: 141,181

[22] Filed: Apr. 17, 1980

[30] Foreign Application Priority Data

Apr. 21, 1979 [DE] Fed. Rep. of Germany ...... 2916228

[51] Int. Cl.³ .................................. B65G 47/12
[52] U.S. Cl. ......................... 414/745; 198/443; 198/445
[58] Field of Search ............ 414/745, 748; 198/396, 198/443, 445, 782; 221/187, 190, 254; 193/35 SS

[56] References Cited

U.S. PATENT DOCUMENTS

| 2,407,638 | 9/1946 | Gettig et al. | 221/254 |
|---|---|---|---|
| 2,995,235 | 8/1961 | Maier | 198/443 X |
| 3,195,737 | 7/1965 | Melrose | 414/745 X |
| 3,232,449 | 2/1966 | Shen | 414/748 |
| 3,265,186 | 8/1966 | Burton | 193/35 SS X |
| 3,394,822 | 7/1968 | Bethke | 198/782 X |

FOREIGN PATENT DOCUMENTS

| 1247950 | 8/1967 | Fed. Rep. of Germany | 414/745 |
|---|---|---|---|
| 522942 | 7/1976 | U.S.S.R. | 221/254 |

Primary Examiner—Leslie J. Paperner
Attorney, Agent, or Firm—Holman & Stern

[57] ABSTRACT

A device for disentangling bundles of concrete-reinforcing steel bars comprises a storage bed composed of a number of frame units each of which defines a respective upwardly opening V-shaped recess, the bars being received in the recesses and the frame units being spaced apart longitudinally of the bars with the recesses mutually aligned. A plurality of lifters intermesh with the frame units, each lifter being vertically movable in a space defined between a respective adjacent pair of the frame units and including a middle part having a flat upper surface whose width perpendicular to the bars is intermediate the width of an upper end of each recess and the width of a lower end of each recess. Means is also provided for raising and lowering the lifters.

8 Claims, 3 Drawing Figures